United States Patent [19]

Nishimura et al.

[11] Patent Number: 5,624,102
[45] Date of Patent: Apr. 29, 1997

[54] STRUCTURE FOR SEALING AN INNER PERIPHERAL PORTION OF A METALLIC DIAPHRAGM

[75] Inventors: Ryutaro Nishimura; Michio Yamaji; Kenji Yamamoto, all of Osaka, Japan

[73] Assignee: Fujikin Incorporated, Osaka, Japan

[21] Appl. No.: 540,971

[22] Filed: Oct. 11, 1995

[30] Foreign Application Priority Data

Oct. 17, 1994 [JP] Japan .................................. 6-250256

[51] Int. Cl.$^6$ ................................................ F16K 31/00
[52] U.S. Cl. ................................ 251/335.2; 251/335.1
[58] Field of Search ............................. 251/335.2, 335.1

[56] References Cited

U.S. PATENT DOCUMENTS

| | | | |
|---|---|---|---|
| 1,662,291 | 3/1928 | Bastian | 251/335.2 |
| 2,051,350 | 8/1936 | Smith | 251/335.2 |
| 4,671,490 | 6/1987 | Kolenc et al. | 251/335.2 |
| 4,750,709 | 6/1988 | Kolenc et al. | 251/335.2 |

*Primary Examiner*—A Michael Chambers
*Attorney, Agent, or Firm*—Griffin, Butler, Whisenhunt & Kurtossy

[57] ABSTRACT

An inner peripheral portion of a metallic diaphragm (11) having a mounting hole (11a) at a central portion is held between a metallic welding fitting (8, 8') and a metallic holding member (6, 17), each respectively having an annular flat portion (8a, 6a, 17a) to contact an inner peripheral portion. The inner peripheral portion of the metallic diaphragm and the portions of the metallic welding fitting and the metallic holding member contacting the inner peripheral portion of the foregoing metallic diaphragm are welded at W', W" along entire peripheries thereof in order to secure these three components together as one body.

3 Claims, 5 Drawing Sheets

STRUCTURE FOR SEALING AN INNER PERIPHERAL PORTION OF A METALLIC DIAPHRAGM

BACKGROUND OF THE INVENTION

This invention relates to a structure for sealing an inner peripheral portion of a metallic diaphragm used in diaphragm valves, diaphragm type disk valves or the like, of a type installed in fluid transfer lines of semiconductor manufacturing plants, for example.

A structure disclosed in the U.S. Pat. No. 4,750,709, for example, is known for sealing an inner peripheral portion of a metallic diaphragm in a diaphragm valve and the like.

In such a prior art sealing structure, as shown in FIG. 5 of this application, an inner peripheral edge portion of a diaphragm 30 is welded to a seat holder 31 at a location W and the inner peripheral portion of the diaphragm 30 is pressed and held in an air-tight state between a metallic holding fitting 32 and the seat holder 31, thereby preventing leakage of fluid about the inner peripheral edge portion of the diaphragm 30.

In FIG. 5, the numeral 33 represents a body, 33a a valve chamber, 33b a valve seat, 33c a fluid passage, 34 a bonnet, 35 a seat, 36 a stem, and 36a a threaded portion formed at a lower edge portion of the stem.

In this structure for sealing the inner peripheral portion of a conventional metallic diaphragm, as shown in FIG. 6, because the inner peripheral portion of the diaphragm 30 is pressed and held between the annular metallic holding fitting 32 and the seat holder 31, with an entire top surface thereof being formed into a curved surface, an deep annular gap is formed between a lower surface of the diaphragm 30 and an upper surface of the seat holder 31. As a result, fluid has been easily trapped in this gap, and once fluid has been trapped in the gap, it has not been possible to easily remove it. Therefore, valves using this conventional sealing structure have had this shortcoming in terms of fluid displacement.

In addition, in this conventional sealing structure, because the inner peripheral portion of the diaphragm 30 is clamped between the holding fitting 32 and the seat holder 31 by a threaded structure, a thread has sometimes became loose over a long period of use, and a pressing and holding of the inner peripheral portion of the diaphragm 30 has sometimes been thereby loosened. As a result of the above, and the fact that the pressing and holding of the diaphragm 30 has been loosened, a large stress has been applied to the inner peripheral edge portion (weld zone) of the diaphragm 30, as the seat holder 31 moves upwardly and downwardly, thereby causing the inner peripheral edge portion of the diaphragm 30, and/or its weld, to easily crack. When the inner peripheral edge portion of the diaphragm 30 is cracked, reduced sealing performance results, which is extremely troublesome.

The present invention has been created to solve the above problems and an object of the present invention is therefore to provide a structure for sealing an inner peripheral portion of a metallic diaphragm which eliminates the trapping of fluid, forestalls cracks at the inner peripheral portion of the diaphragm, and demonstrates excellent sealing performance.

SUMMARY OF THE INVENTION

According to principles of this invention, a structure for sealing an inner peripheral portion of a metallic diaphragm is such that the inner peripheral portion of the metallic diaphragm, which has a mounting hole at a central portion thereof, is held by a metallic welding fitting and a metallic holding member, both having annular flat portions designed to contact the inner peripheral portion of the diaphragm, with the inner peripheral end, or edge, portion of the metallic diaphragm, and portions of the metallic welding fitting and the metallic holding member which contact the inner peripheral edge portion of the diaphragm, being welded about entire peripheries thereof to secure these three components as one body.

Because the inner peripheral portion of the diaphragm is pressed and held by the annular flat portions formed on the metallic welding fitting and the metallic holding member, a gap formed between a lower surface of the diaphragm and an upper surface of the metallic holding member has a relatively small depth. As a result, trapping of fluid between the diaphragm and the metallic holding member becomes difficult and is thereby reduced.

Further, because the inner peripheral portion of the diaphragm, the metallic welding fitting, and the metallic holding member are welded together, and thereby secured as one body, there is no possibility of leakage of fluid about the inner peripheral edge portion of diaphragm, and sealing performance is greatly improved.

Furthermore, because the inner peripheral portion of the diaphragm is pressed and held by the flat portions of the metallic welding fitting and the metallic holding member, no large stress is applied to the inner peripheral edge portion (weld zone) of the diaphragm even when the metallic holding member and the other members are moved upwardly and downwardly. As a result, cracks are not formed at the inner peripheral edge portion of diaphragm, and loosening of the inner peripheral portion of the diaphragm does not take place.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
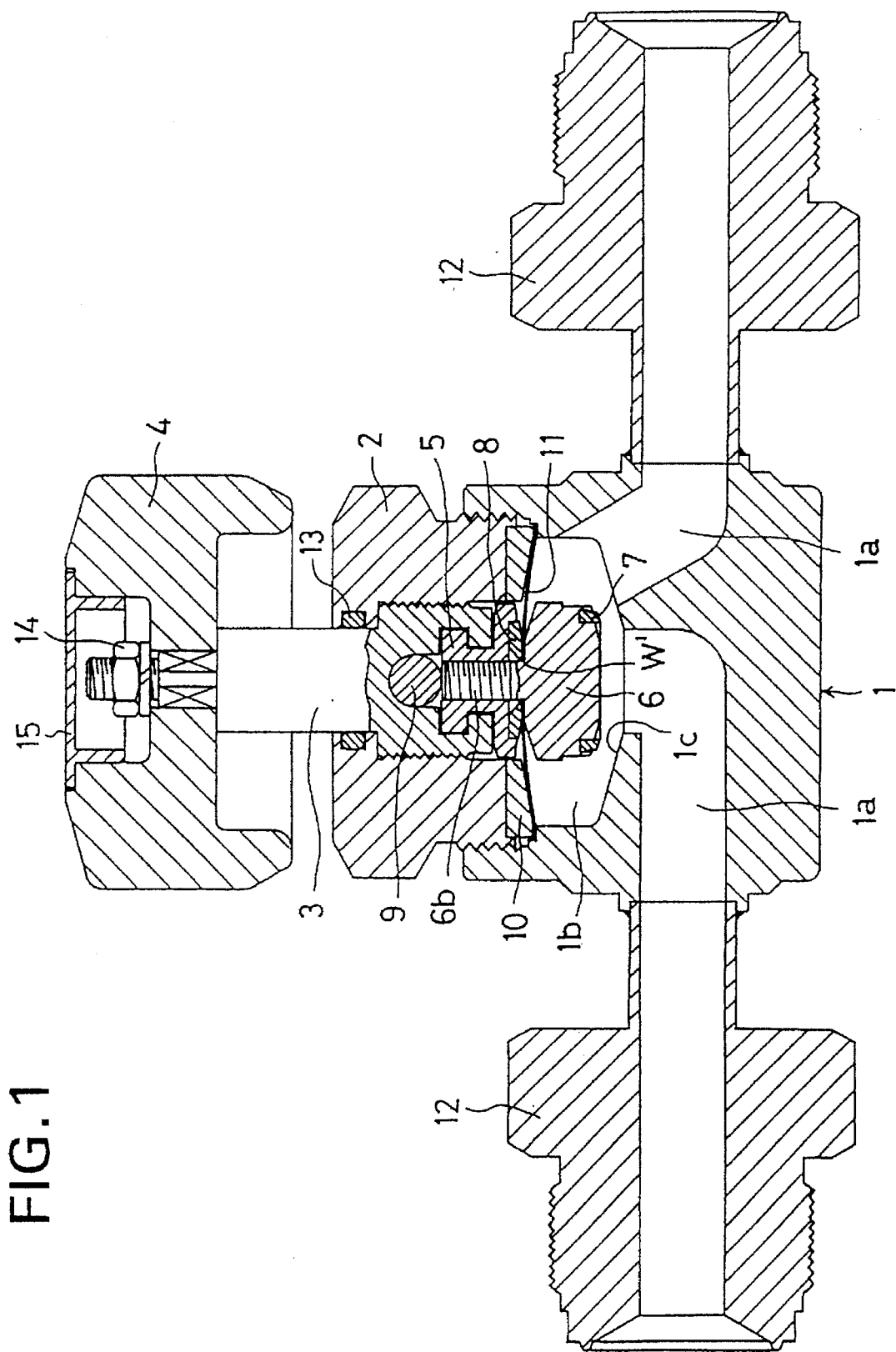
FIG. 1 is an enlarged vertical cross-sectional view of a diaphragm valve using a sealing structure of this invention for an inner peripheral portion of metallic diaphragm.

FIG. 1 is an enlarged vertical cross-sectional view of a diaphragm valve using a sealing structure of this invention, in which an inner peripheral portion of a metallic diaphragm 11, a metallic welding fitting 8, and a metallic holding member (a seat holder 6 in this embodiment) are secured into one body.

The foregoing diaphragm valve comprises a body 1 defining a fluid passage 1a, a valve chamber 1b and a vale seat 1c, a bonnet 2 screwed to the body 1, a stem 3 elevatably screwed to, and supported by, the bonnet 2, a handle 4 installed at an upper end portion of the stem 3, a stem bushing 5 rotatably installed at a lower end portion of the stem 3, the seat holder 6 screwed to the stem bushing 5, a seat 7 on the seat holder 6, the metallic welding fitting 8 mounted on the seat holder 6, a ball 9 housed in the stem 3, and the metallic diaphragm 11 with an outer peripheral portion thereof being pressed and held between the body 1 and the bonnet 2 via a bonnet insert 10 and the inner peripheral portion thereof being held between and secured to the seat holder 6 and the metallic welding fitting 8.

In FIG. 1, the numeral 12 represents a nipple, 13 an O-ring, 14 a mounting nut, and 15 a cap.

In this diaphragm valve, when the stem 3 is moved upwardly and downwardly by rotating the handle 4, components, such as the stem bushing 5 and the seat holder 6, are moved upwardly and downwardly, so that the seat 7 comes into contact with, or moves away from, the valve seat 1c to open or close the fluid passage 1a.

Figure 2:
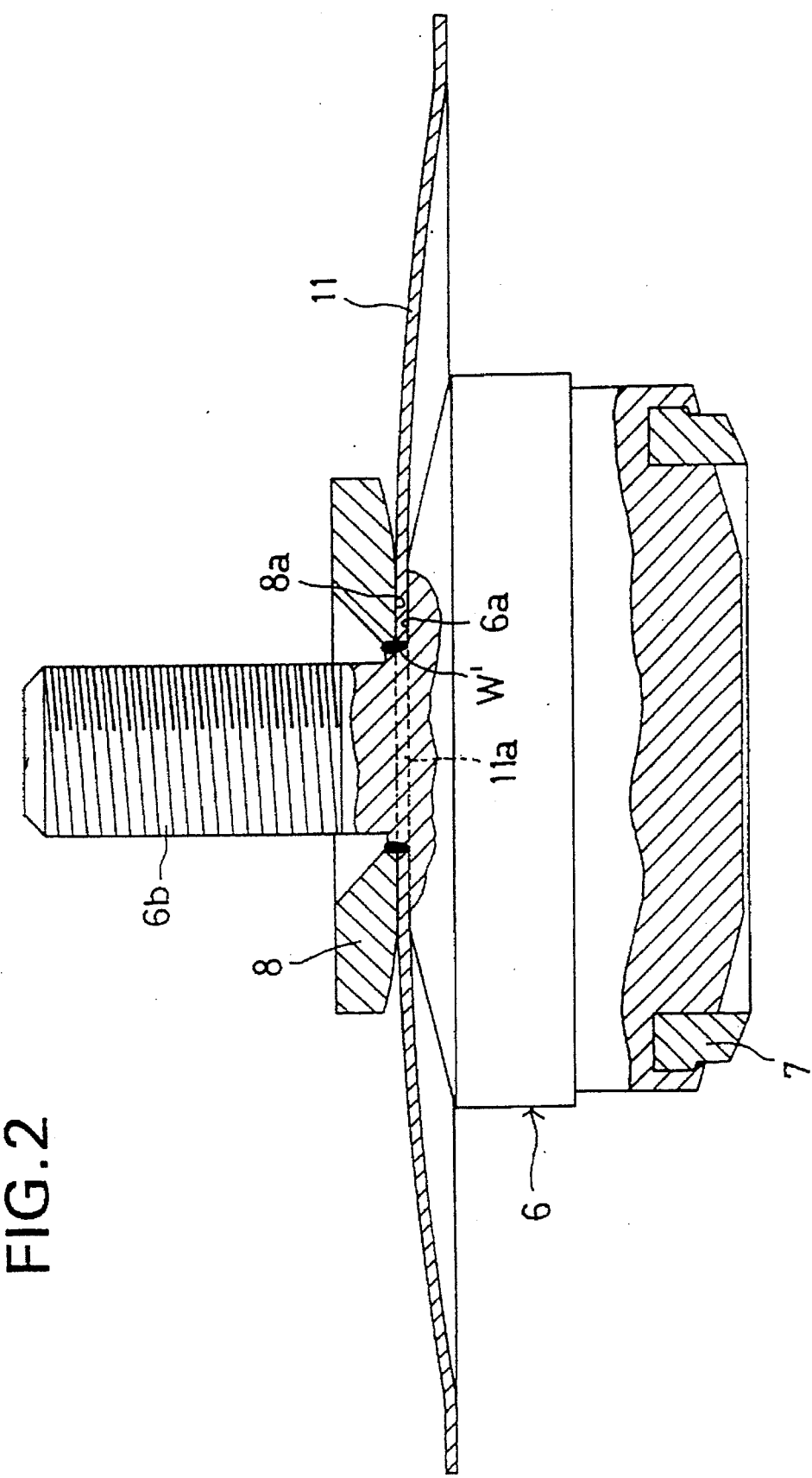
FIG. 2 is an enlarged detailed cross-sectional view of important components of FIG. 1.

A sealing structure according to the present invention, as shown in FIG. 2, is such that the inner peripheral portion of the diaphragm 11 is held between annular flat portions 8a and 6a respectively formed on the metallic welding fitting 8 and the metallic holding member (the seat holder 6 in this embodiment); with the inner peripheral edge portion of the metallic diaphragm 11 and portions of the welding fitting 8 and the seat holder 6 contacting the inner peripheral edge portion of the diaphragm 11 being fastened about their entire peripheries by a welding W' in order to secure these components as one body.

More specifically, the foregoing diaphragm 11 is formed of a plurality of very thin metallic sheets (approximately 0.1 to 0.2 mm thick) made from stainless steel (SUS316L), formed into a dish-like shape and laid on top of one another. A mounting hole 11a is formed at a central portion thereof, through which a shaft portion 6b of the seat holder 6 extends.

The metallic welding fitting 8 is formed into a ring-like body from metallic material, such as a stainless steel (SUS316L), with the annular flat portion 8a being formed of an inner peripheral portion thereof to contact an upper surface of the inner peripheral portion of the diaphragm 11. That is, the metallic welding fitting 8 has a hole of almost the same diameter as the mounting hole 11a of the diaphragm 11, and is provided with the flat portion 8a at its inner periphery on its lower surface. Also, a thickness of the inner periphery of the metallic welding fitting 8 is smaller than a thickness of an outer periphery thereof to facilitate creating the welding W'. Further, the seat holder 6 is formed into a roughly cylindrical shape from metallic material, such as stainless steel (SUS316L), and has the annular flat portion 6a on its upper surface to contact the lower surface of the inner peripheral portion of the diaphragm 11. The shaft portion 6b is integrally provided at the central portion of the seat holder 6 to be screwed to the stem bushing 5.

The inner peripheral portion of the diaphragm 11 is held by the flat portions 8a and 6a of the metallic welding fitting 8 and the seat holder 6, and is secured to both of these components. Namely, the inner peripheral edge portion of the metallic diaphragm 11, and the portions of the metallic welding fitting 8 and the seat holder 6 contacting the inner peripheral edge portion of the foregoing metallic diaphragm 11, are secured about their entire peripheries by the welding W' in order to secure these three components together as one body.

The outer peripheral portion of the diaphragm 11 is placed between the body 1 and the bonnet insert 10 and held and supported therebetween by tightening the bonnet 2 into the body 1.

Further, the widths of the flat portions 6a and 8a of the metallic welding fitting 8 and the seat holder 6 are set to satisfy various conditions such as for instance: (1) the inner peripheral portion of the diaphragm 11 is not allowed to be deformed more than is necessary for pressing and holding the inner peripheral portion of the diaphragm 11; (2) smooth and proper elastic deformation of the diaphragm 11 is permitted; and (3) the inner peripheral portion of the diaphragm 11 is pressed and held securely and properly.

In a structure for sealing the inner peripheral portion of the metallic diaphragm 11 constructed in the manner described above, because the inner peripheral portion of the diaphragm 11 is pressed and held by the flat portions 8a and 6a of the metallic welding fitting 8 and the seat holder 6, a gap formed between the lower surface of the diaphragm 11 and the upper surface of the seat holder 6 is relatively small in depth, thereby making it difficult for fluid to be trapped between the diaphragm 11 and the seat holder 6. As a result, in a valve using the sealing structure of the present invention, fluid-replacement performance is improved as compared to that for a valve which uses a conventional sealing structure.

Further, because the three components at the inner peripheral portion of the diaphragm 11, including the metallic welding fitting 8 and the seat holder 6, are secured into one integrated body by the welding W', there is no possibility of leakage of fluid into and from the valve chamber 1b about the inner peripheral edge portion of the diaphragm 11, and thus the sealing performance is greatly improved.

Furthermore, because the inner peripheral portion of the diaphragm 11 is pressed and held by the flat portions 8a and 6a of the metallic welding fitting 8 and the seat holder 6, no large stress is applied to the inner peripheral edge portion (weld zone) of the diaphragm 11, even when the seat holder 6 moves upwardly and downwardly. As a result, cracks are hardly ever formed at the inner peripheral portion of the diaphragm 11, and loosening of the inner peripheral portion of the diaphragm 11 does not take place.

Figure 3:
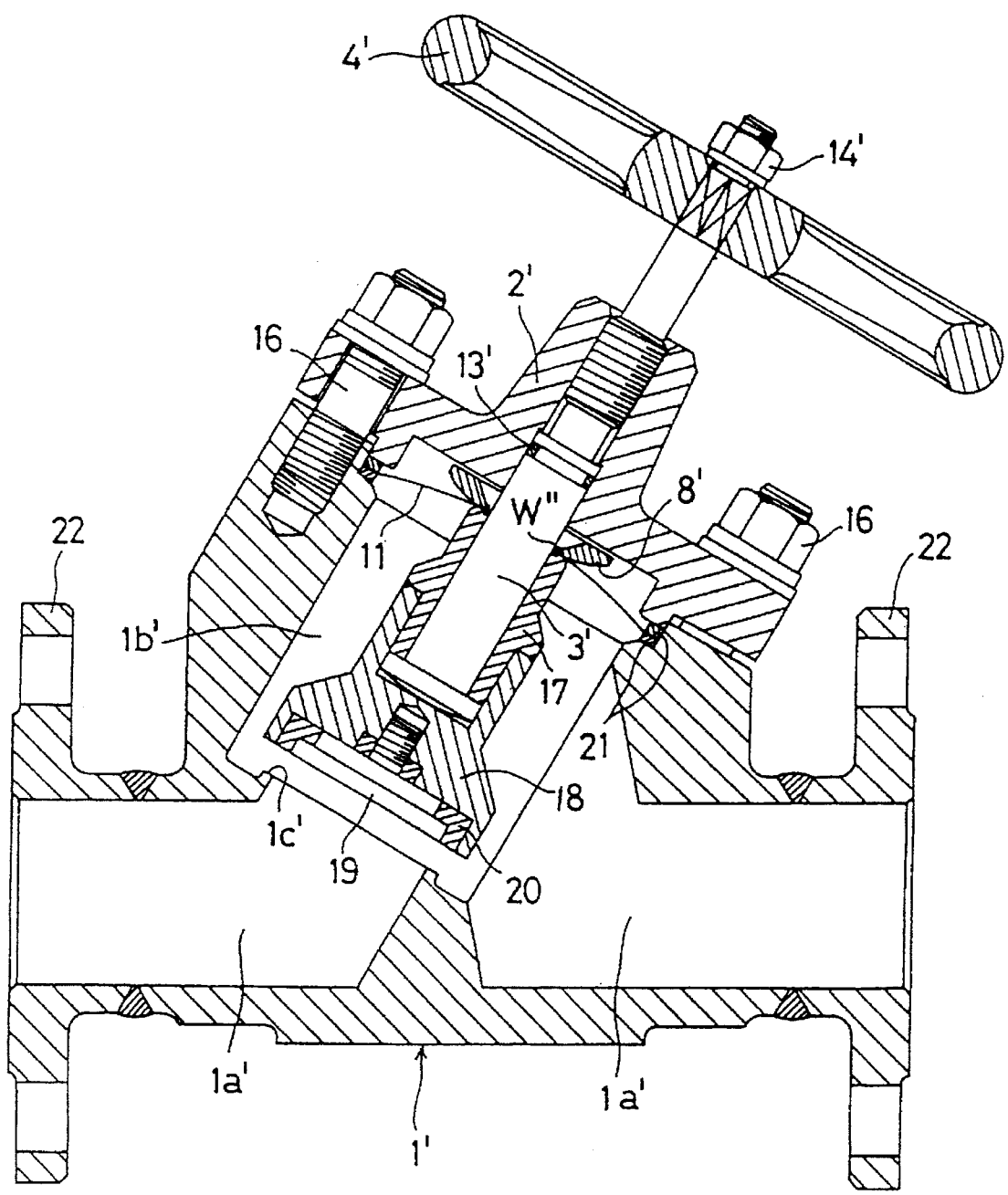
FIG. 3 is an enlarged vertical cross-sectional view of a diaphragm type disk valve using a second embodiment sealing structure of this invention for an inner peripheral portion of a metallic diaphragm.

FIG. 3 is an enlarged vertical sectional view of a diaphragm type disk valve using a second embodiment sealing structure of the present invention, in which the inner peripheral portion of the diaphragm 11, a metallic welding fitting 8', and a metallic holding member (the valve holder 17 in this embodiment) are secured as one body.

This diaphragm type disk valve comprises a body 1' defining a fluid passage 1a' a valve chamber 1b' and a valve seat 1c', a bonnet 2' held on the body 1', a plurality of bolts and nuts 16, a stem 3' elevatably screwed through, and supported by, the bonnet 2', a handle 4' attached at the upper edge portion of the stem 3', the valve holder 17 rotatably fitted at the lower edge portion of the stem 3', a disk 18 welded to the valve holder 17, a disk packing 20 mounted on the disk 18 by means of a packing holder 19, the metallic welding fitting 8' fitted and mounted on the stem 3', and the metallic diaphragm 11 with its outer peripheral portion being held and supported between the body 1' and the bonnet 2' via gaskets 21 and its inner peripheral portion being held and pressed between the valve holder 17 and the metallic welding fitting 8' and then secured to the valve holder 17 and the metallic welding fitting 8.

In FIG. 3, the numeral 13' represents an O-ring, 14' a mounting nut, and 22 a flange.

Also for this diaphragm type disk valve, when the stem 3' is moved upwardly or downwardly by rotating the handle 4', the valve holder 17 and the disk 18, as well as other parts, are moved upwardly or downwardly, so that the disk packing 20 is caused to contact or move away from the valve seat 1c' to close or open the fluid passage 1a'.

Figure 4:
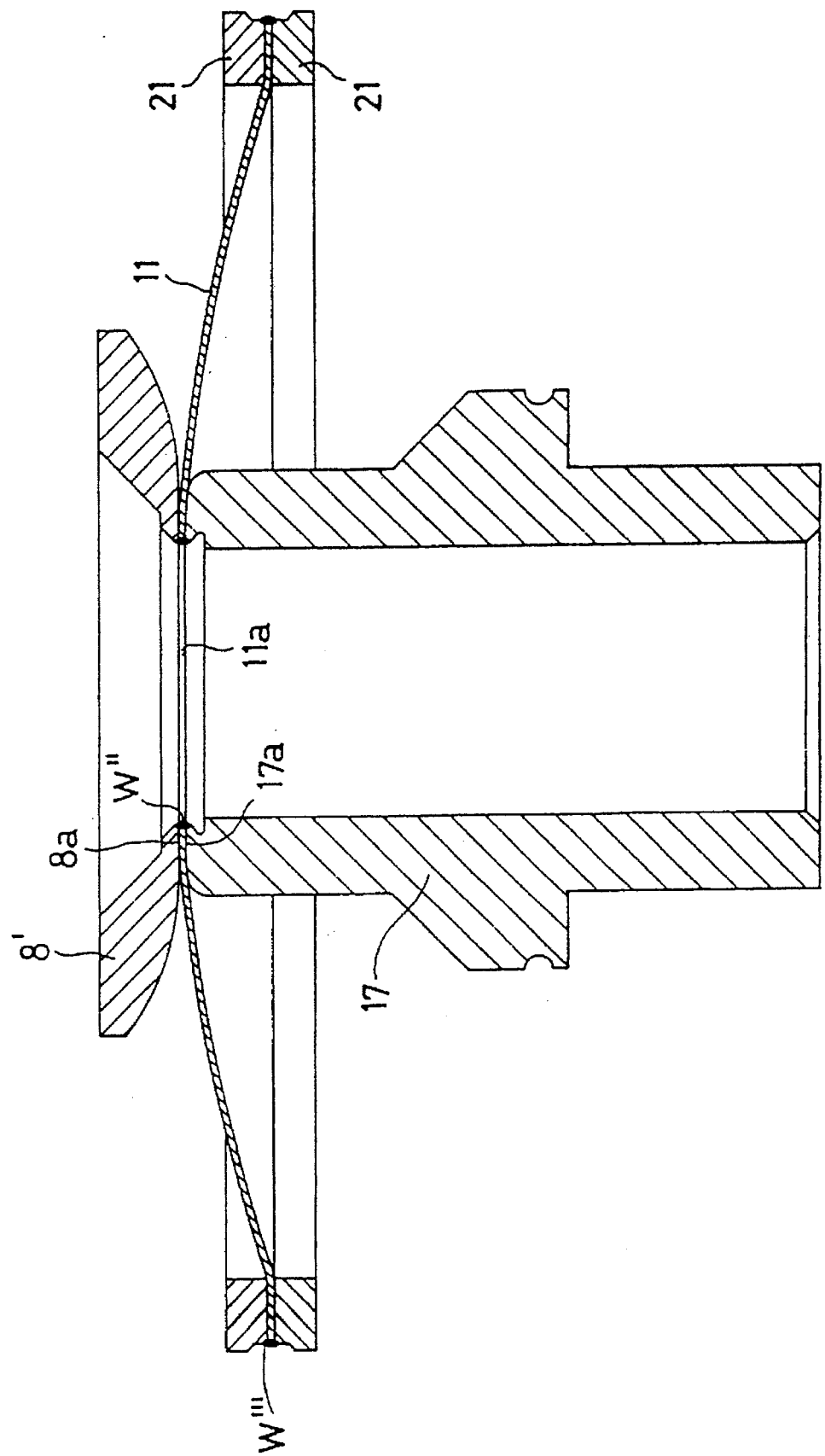
FIG. 4 is an enlarged detailed cross-sectional view of important components of FIG. 3.
Figure 5:
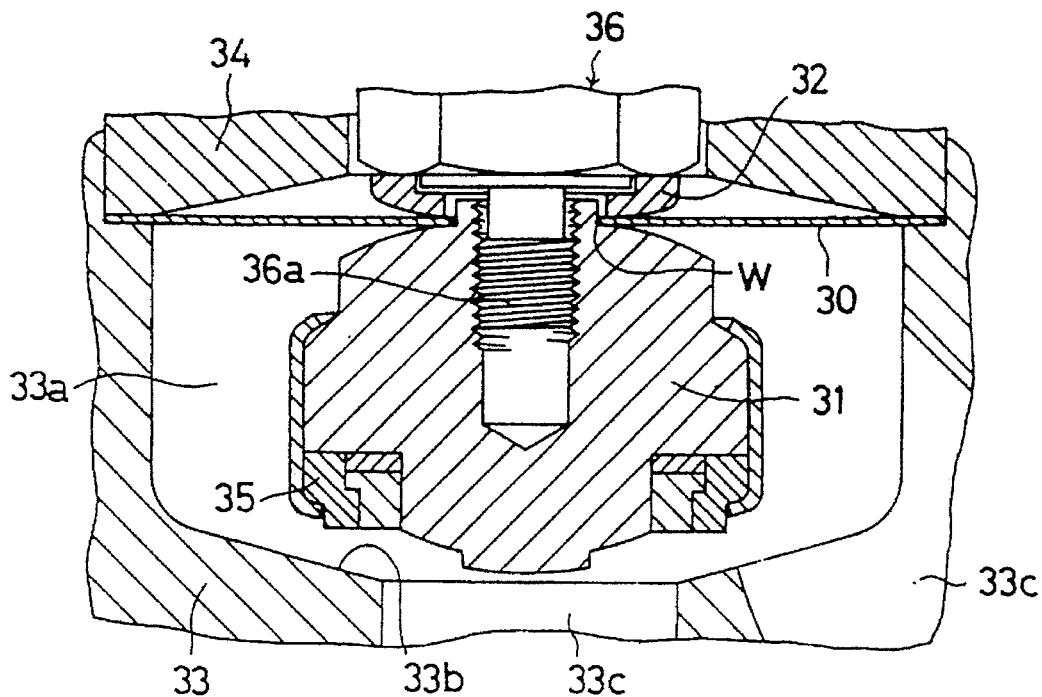
FIG. 5 is an enlarged vertical cross-sectional view of important components of a prior-art diaphragm valve using a conventional sealing structure.
Figure 6:
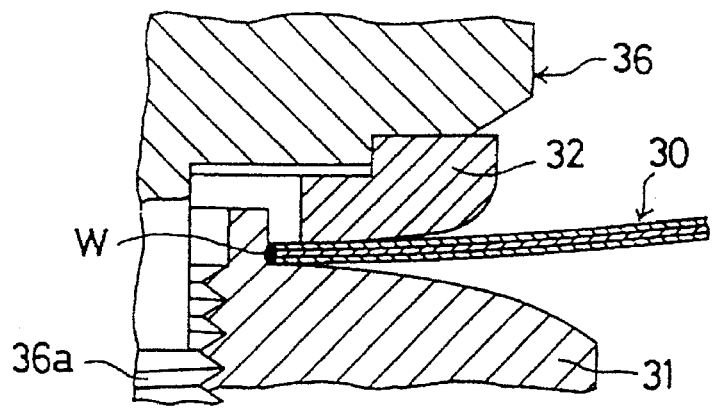
FIG. 6 is an enlarged detailed cross-sectional view of important components of FIG. 5.

The sealing structure of the present invention, as shown in detail in FIG. 4, is such that the inner peripheral portion of the diaphragm 11 is held between annular flat portions 8a and 17a formed on the metallic welding fitting 8' and the metallic holding member (the valve holder 17 in this embodiment) respectively, and the inner peripheral edge portion of the metallic diaphragm 11 and the portions of the metallic welding fitting 8' and the valve holder 17 contacting the inner peripheral edge portion of the metallic diaphragm 11 are welded about entire peripheries thereof by a welding W" in order to secure these three components together as one body.

More specifically, the foregoing diaphragm 11 is formed by laying a plurality of very thin metal sheets (outside diameter: 93 mm, thickness: 0.1 to 0.2 mm) on one another, each sheet respectively formed into a dish-like like shape from stainless steel (SUS316L), or the like, and having a mounting hole 11a (inside diameter: 20 mm) formed at a central portion thereof.

Further, the metallic welding fitting 8' is formed into an annular shape from a metallic material such as stainless steel (SUS316L), and the annular flat portion 8a is formed at the lower surface of the inner peripheral portion to contact the upper surface of the inner peripheral portion of the diaphragm 11.

Furthermore, the valve holder 17 is formed into a cylindrical shape from a metallic material such as stainless steel (SUS316L), and the annular flat portion 17a is formed on the upper surface thereof to contact the lower surface of the inner peripheral portion of the diaphragm 11.

In addition, the inner peripheral portion of the diaphragm 11 is held by the flat portion 8a of the metallic welding fitting 8' and the flat portion 17a of the valve holder 17 and is secured to both these components. In other words, the inner peripheral edge portion of the metallic diaphragm 11 and the inner peripheral edge portions of the metallic welding fitting and the seat holder 17 are fastened at their entire peripheries by the welding W" in order to secure these three components as one body.

Furthermore, the diaphragm 11 is welded at the outer peripheral portion thereof to a pair of gaskets 21 comprising metallic rings. In other words, the outer peripheral portion of the diaphragm 11 is placed between the gaskets 21, and the contacting portions of these three layers are secured along their entire outer peripheries thereof by a welding W'". According to various conditions, such as the diameter of the diaphragm 11 and other things, each gasket 21 is supposed to provide a desired binding pressure and to have sufficient thickness for reinforcing the diaphragm 11, and its material is suitably selected so that it can be welded. In this embodiment, an NLCP ring and a stainless steel ring of approximately 93 mm in outside diameter and 3 mm in thickness are used for each gasket 21.

The foregoing diaphragm 11 is such that an annular portion of the three layer structure comprising the outer peripheral portion thereof and the gaskets 21 are held between the body 1' and the bonnet 2', and pressed and supported between the body 1' and the bonnet 2' by tightening the bolts and nuts 16.

The structure for sealing the inner peripheral portion of the metallic diaphragm 11 in the diaphragm type disk valve, when structured as described above for FIGS. 3 and 4, exhibits the same action and effect as that of the first embodiment of FIG. 1.

In the diaphragm type disk valve of FIGS. 3 and 4, because a plurality of very thin metal sheets which make up the diaphragm 11 are made into one body fastened inseparably at the outer and inner peripheral portions, there is no possibility for fluid to enter between the very thin metal sheets through the mounting hole 11a and the like.

Further, because the outer peripheral portion of the diaphragm 11 is pressed and held between the body 1' and the bonnet 2' via thick gaskets 21, which hold the outer peripheral portion of the diaphragm 11, sufficient tightening surface pressure can be applied along the entire periphery thereof. As a result of the above and also because the contacting portions of the diaphragm 11 and the gaskets 21 are secured along the entire outer peripheries thereof by the welding W'", there is no possibility for fluid to leak through the outer peripheral portion of the diaphragm 11.

Moreover, the diaphragm 11 will be provided with substantially improved strength as a whole by the reinforcing effect obtained by the gaskets 21 secured to the outer peripheral portion thereof. As a result, the diaphragm 11 will not be deformed during handling or assembling, so that the diaphragm 11 can be installed and held in appropriate form, and the functions of the diaphragm 11 can be fully demonstrated.

In the embodiment described above, the diaphragm 11 is composed of a plurality of very thin metal sheets, but the diaphragm 11 may be one thin metal sheet. In this case, too, it is possible for the diaphragm to have the same action and effect as described above.

As mentioned above, in the structure for sealing the inner peripheral portion of the metallic diaphragm of the present invention, because the inner peripheral portion of the diaphragm is pressed and held by the flat portion of the metallic welding fitting and the flat portion of the metallic holding member, the gap formed between the diaphragm and the metallic holding member will have a smaller depth as compared to that of conventional sealing structures. As a result, it becomes difficult for fluid to be trapped in a space between the diaphragm and the metallic holding member. Therefore, in a valve using the sealing structure of the present invention, gas-displacement performance will be improved as compared to that of a valve using a conventional sealing structure.

Further, because three components at the inner peripheral portion of the diaphragm, including the diaphragm, the metallic welding fitting, and the metallic holding member, are secured into one body by welding, there is no possibility for fluid to leak through or about the inner peripheral edge portion of the diaphragm, and the sealing performance is very high.

Furthermore, because the inner peripheral portion of the diaphragm is pressed and held by the flat portions of the metallic welding fitting and the metallic holding member, no large stress is applied to the inner peripheral edge portion (weld zone) of the diaphragm even when the metallic holding member is moved upwardly or downwardly. As a result, cracks are hardly formed in the inner peripheral portion of the diaphragm. It also prevents loosening of the inner peripheral portion of the diaphragm from the flat portions.

The invention claimed is:

1. A structure for sealing hermetically in an air-tight state an inner peripheral portion of a metallic diaphragm at an upper part of a valve chamber formed in a body of a valve wherein:

the inner peripheral portion of the metallic diaphragm is formed with a mounting hole at a central portion thereof;

a metallic welding fitting and a metallic holding member are positioned on opposite sides of the metallic diaphragm, each respectively forming an annular flat portion to contact said inner peripheral portion of the diaphragm, the inner peripheral portion of the metallic diaphragm and portions of the metallic welding fitting and the metallic holding member contacting the inner peripheral portion of said metallic diaphragm being welded together about entire peripheries thereof in order to secure these three components as one body;

wherein the metallic welding fitting, and the metallic holding member are welded in a vicinity of the mounting hole of the metallic diaphragm;

wherein the metallic diaphragm is formed of a plurality of thin metal sheets laid on one another; and wherein the metallic welding fitting has a ring shape and is provided with a welding fitting hole having approximately the same diameter as the mounting hole of the metallic diaphragm, the flat portion of the welding fitting being formed at an inner periphery edge defining the welding-fitting hole at a lower surface of the metallic welding fitting, a thickness of the inner periphery edge of the metallic welding fitting forming the welding fitting hole being smaller than a thickness of an outer periphery edge of the metallic welding fitting.

2. A structure for sealing according to claim 1, wherein the metallic holding member is part of a seat holder having on an upper surface thereof a shaft for extending through the mounting hole of the metallic diaphragm and the welding-fitting hole, said seat holder having on a lower surface thereof a seat which contacts a valve seat of said body.

3. A structure for sealing according to claim 1 wherein the metallic holding member is a cylindrical valve holder, having a disk secured thereto in which a stem is inserted, and which is provided with a disk packing at the lower part thereof.

* * * * *